(12) United States Patent
An et al.

(10) Patent No.: US 12,431,567 B2
(45) Date of Patent: Sep. 30, 2025

(54) SECONDARY BATTERY AND METHOD FOR MANUFACTURING THE SAME

(71) Applicant: LG Energy Solution, Ltd., Seoul (KR)

(72) Inventors: In Gu An, Daejeon (KR); Ki Woong Kim, Daejeon (KR); Seok Je Kim, Daejeon (KR); Hyoung Sik Choi, Daejeon (KR); Yun Pyo Oh, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 662 days.

(21) Appl. No.: 17/783,492

(22) PCT Filed: May 12, 2021

(86) PCT No.: PCT/KR2021/005964
§ 371 (c)(1),
(2) Date: Jun. 8, 2022

(87) PCT Pub. No.: WO2021/246674
PCT Pub. Date: Dec. 9, 2021

(65) Prior Publication Data
US 2023/0008194 A1    Jan. 12, 2023

(30) Foreign Application Priority Data
Jun. 4, 2020    (KR) .................. 10-2020-0067821

(51) Int. Cl.
*H01M 50/186* (2021.01)
*H01M 10/04* (2006.01)
(Continued)

(52) U.S. Cl.
CPC ......... *H01M 50/186* (2021.01); *H01M 10/04* (2013.01); *H01M 50/105* (2021.01); *H01M 50/242* (2021.01)

(58) Field of Classification Search
CPC ............ H01M 50/186; H01M 50/242; H01M 50/105; H01M 10/04
(Continued)

(56) References Cited

U.S. PATENT DOCUMENTS

2014/0050970 A1* 2/2014 Li ..................... H01M 4/622
                                                                29/623.5
2017/0222197 A1    8/2017 Sawada et al.
(Continued)

FOREIGN PATENT DOCUMENTS

CN        101183736 A    5/2008
CN        202687165 U    1/2013
(Continued)

OTHER PUBLICATIONS

Extended European Search Report including Written Opinion for Application No. 21817190.8 dated Jan. 2, 2023, pp. 1-8.
(Continued)

*Primary Examiner* — Allison Bourke
*Assistant Examiner* — Robert Gene West
(74) *Attorney, Agent, or Firm* — Lerner David LLP

(57) ABSTRACT

A secondary battery according to the present invention comprises a pouch comprising an accommodation part accommodate the electrode assembly, a gas pocket part collecting a gas generated in the accommodation part, an edge sealing part provided along each of edge surfaces of the accommodation part and the gas pocket part, and a corner sealing part provided on each of both ends of a boundary between the accommodation part and the gas pocket part to support the electrode assembly accommodated in the accommodation part, wherein the corner sealing part comprises a full-width support surface supporting one end in a full-width direction of the electrode assembly, which faces the gas pocket part, and a full-length support surface provided
(Continued)

between the full-width support surface and the edge sealing part, having a width greater than that of the full-width support surface, and supporting one end in a full-length direction of the electrode assembly, which faces the edge sealing part, and the full-length support surface, the full-width support surface, and the edge sealing part are integrally connected to each other.

9 Claims, 6 Drawing Sheets

(51) Int. Cl.
  *H01M 50/105* (2021.01)
  *H01M 50/242* (2021.01)
(58) Field of Classification Search
  USPC .......................................................... 429/163
  See application file for complete search history.

(56) References Cited

U.S. PATENT DOCUMENTS

| | | | |
|---|---|---|---|
| 2019/0305261 A1 | 10/2019 | Kim et al. | |
| 2019/0393455 A1 | 12/2019 | Seo et al. | |
| 2020/0067034 A1* | 2/2020 | Kim | H01M 50/394 |
| 2020/0185675 A1 | 6/2020 | Lee et al. | |
| 2021/0218051 A1 | 7/2021 | Yan et al. | |
| 2021/0288360 A1 | 9/2021 | Kim et al. | |

FOREIGN PATENT DOCUMENTS

| | | |
|---|---|---|
| CN | 109873092 A | 6/2019 |
| CN | 110495008 A | 11/2019 |
| JP | 2001126683 A | 5/2001 |
| JP | 2016009677 A | 1/2016 |
| JP | 2017157445 A | 9/2017 |
| JP | 2019-003842 A | 1/2019 |
| KR | 101726783 B1 | 4/2017 |
| KR | 101760985 B1 | 7/2017 |
| KR | 20170132565 A | 12/2017 |
| KR | 20180107461 A | 10/2018 |
| KR | 20190023649 A | 3/2019 |
| KR | 20190042800 A | 4/2019 |
| KR | 20190042801 A | 4/2019 |
| KR | 20190114645 A | 10/2019 |
| WO | 2016009989 A1 | 1/2016 |
| WO | 2019-078447 A1 | 4/2019 |

OTHER PUBLICATIONS

International Search Report for PCT/KR2021/005964 dated Sep. 1, 2021. 3 pgs.

* cited by examiner

1

SECONDARY BATTERY AND METHOD FOR MANUFACTURING THE SAME

CROSS-REFERENCE TO RELATED APPLICATION

The present application is a national stage entry under 35 U.S.C. § 371 of International Application No. PCT/KR2021/005964, filed on May 12, 2021, published in Korean, which claims priority to Korean Patent Application No. 10-2020-0067821, filed on Jun. 4, 2020, which are hereby incorporated by reference in their entireties.

TECHNICAL FIELD

The present invention relates to a secondary battery that improves a structure of a corner sealing part formed at each of both ends between an electrode assembly accommodation part and a gas pocket part of a pouch to prevent cracks from occurring and a method for manufacturing the same.

BACKGROUND ART

In general, secondary batteries refer to chargeable and dischargeable, unlike primary batteries that are not chargeable. The secondary batteries are being widely used for mobile phones, notebook computers, and camcorders, power storage device, electric vehicles, and the like.

The secondary battery is classified into a can-type secondary battery, in which an electrode assembly is embedded in a metal can, and a pouch-type secondary battery, in which an electrode assembly is embedded in a pouch. The pouch-type secondary battery comprises an electrode assembly, in which electrodes and a separator are alternately stacked, a pouch, which accommodates the electrode assembly, and an electrode lead coupled to an electrode tab provided in the electrode assembly. Here, the electrode tab and the electrode lead are coupled to each other through welding.

The pouch comprises an accommodation part accommodating an electrode assembly, a gas collection part collecting a gas generated in the accommodation part, an edge sealing part formed along edge surfaces of the accommodation part and the gas pocket part, and a corner sealing part provided on each of both ends of a boundary between the accommodation part and the gas pocket part.

However, there is a problem that the corner sealing part of the pouch is cracked by uneven abrasion or stab due to collision with the electrode assembly accommodated in the accommodation part.

DISCLOSURE OF THE INVENTION

Technical Problem

The present invention is invented to solve the above problems, and an object of the present invention is to provide a secondary battery, in which a corner sealing part provided at each of both ends of a boundary between an accommodation part and a gas pocket part is improved to increase in strength, thereby preventing the corner sealing part from being unevenly worn or stabbed to prevent cracks from occurring, and a method for manufacturing the same.

Technical Solution

A secondary battery according to the present invention for achieving the above object comprises a pouch comprising an accommodation part accommodate the electrode assembly, a gas pocket part collecting a gas generated in the accommodation part, an edge sealing part provided along each of edge surfaces of the accommodation part and the gas pocket part, and a corner sealing part provided on each of both ends of a boundary between the accommodation part and the gas pocket part to support the electrode assembly accommodated in the accommodation part, wherein the corner sealing part comprises a full-width support surface supporting one end in a full-width direction of the electrode assembly, which faces the gas pocket part, and a full-length support surface provided between the full-width support surface and the edge sealing part, having a width greater than that of the full-width support surface, and supporting one end in a full-length direction of the electrode assembly, which faces the edge sealing part, and the full-length support surface, the full-width support surface, and the edge sealing part are integrally connected to each other.

The full-length support surface and the full-width support surface may have the same length in the full-width direction of the electrode assembly.

One surface of the full-width support surface, which faces the electrode assembly and is connected to the full-length support surface, may be formed as a curved groove.

One surface of the full-length support surface, which face the electrode assembly and is connected to the edge sealing part, may be formed as a curved groove.

A corner of the full-length support surface, which faces the electrode assembly, may be formed as a curved protrusion.

The curved groove of the full-width support surface and the curved groove of the full-length support surface may have the same curvature radius.

The curved protrusion may have a curvature radius less than that of the curved groove of the full-width support surface and the curved groove of the full-length support surface.

A support protrusion having a width greater than that of the full-width support surface when viewed in the full-width direction of the electrode assembly may be provided on an end of the full-width support surface.

One or more buffer protrusions, each of which has an arc shape and which protrudes in a direction facing the electrode assembly, may be provided on the curved groove of the full-width support surface.

One or more buffer protrusions, each of which has an arc shape and which protrudes in a direction facing the electrode assembly, may be provided on the curved groove of the full-length support surface.

A method for manufacturing a secondary battery according to the present invention comprises: a pouch preparation step (S10) of preparing a pouch comprising an accommodation part accommodating an electrode assembly and a gas pocket part collecting a gas generated in the accommodation part; a first sealing step (S20) of sealing edge surfaces of the accommodating part and the gas pocket part in the state of accommodating the electrode assembly in the accommodation part of the pouch to form an edge sealing part; and a second sealing step (S30) of sealing each of both ends of a boundary between the accommodation part and the gas pocket pat to form a corner sealing part, wherein, in the second sealing step (S30), the corner sealing part comprises a full-width support surface sealed to support one end in a full-width direction of the electrode assembly, which faces the gas pocket part, and a full-length support surface provided between the full-width support surface and the edge sealing part, having a width greater than that of the full-width support surface, and supporting one end in a full-length direction of the electrode assembly, which faces the edge sealing part, and the full-length support surface, the full-width support surface, and the edge sealing part are sealed to be integrally connected to each other.

In the second sealing step (S30), when the full-width support surface is sealed, one surface of the full-width support surface, which faces the electrode assembly and is connected to the full-length support surface, may be sealed as a curved groove.

In the second sealing step (S30), when the full-length support surface is sealed, one surface of the full-length support surface, which faces the electrode assembly and is connected to the edge sealing part, may be sealed as a curved groove.

In the second sealing step (S30), when the full-length support surface is sealed, a corner of the full-length support surface, which faces the electrode assembly, may be sealed as a curved protrusion.

ADVANTAGEOUS EFFECTS

The secondary battery according to the present invention may comprise the accommodation part, the gas pocket part, the edge sealing part, and the corner sealing part, and the corner sealing part may comprise the full-width support surface and the full-length support surface. Here, the full-length support surface, the full-width support surface, and the edge sealing part may be integrally connected to each other. Due to these characteristics, the strength of the corner sealing part may significantly increase, and the sharply protruding end may be removed to prevent the corner sealing part from being unevenly worn or stabbed by the electrode assembly, thereby preventing the corner sealing part from being cracked.

In addition, in the secondary battery according to the present invention, the full-length support surface and the length of the full-width support surface may have the same length in a full-width direction of the electrode assembly. Due to this characteristic, the strength of the full-length support surface and the full-width support surface may be maintained equally, and thus, the electrode assembly may be stably supported through the full-length support surface and the full-width support surface.

In addition, in the secondary battery according to the present invention, the one surface of the full-width support surface, which faces the electrode assembly and is connected to the full-length support surface, may be formed as the curved groove, and the one surface of the full-length support surface, which faces the electrode assembly and is connected to the edge sealing part, may be formed as the curved groove. Due to the characteristic, the electrode assembly and the edge sealing part may increase in surface contact force, and thus, the edge sealing part may be prevented from being unevenly worn and stabbed.

In addition, in the secondary battery according to the present invention, the support protrusion having the width greater than that of the full-width support surface when viewed in the full-width direction of the electrode assembly may be provided on the end of the full-width support surface of the secondary battery. Due to this characteristic, the strength of the end of the full-width support surface may be reinforced to prevent the full-width support surface from being unevenly worn or stabbed.

In addition, in the secondary battery according to the present invention, one or more buffer protrusions, each of which has the arc shape, may be provided on the curved groove of the full-width support surface and the curved groove of the full-length support surface. Due to this characteristic, the electrode assembly may be supported on the buffer protrusion before being supported on the curved groove of the full-width support surface and the curved groove of the full-length support surface to reduce the impact force, thereby significantly preventing the corner sealing part from being unevenly worn or stabbed.

MODE FOR CARRYING OUT THE INVENTION

Figure 1:
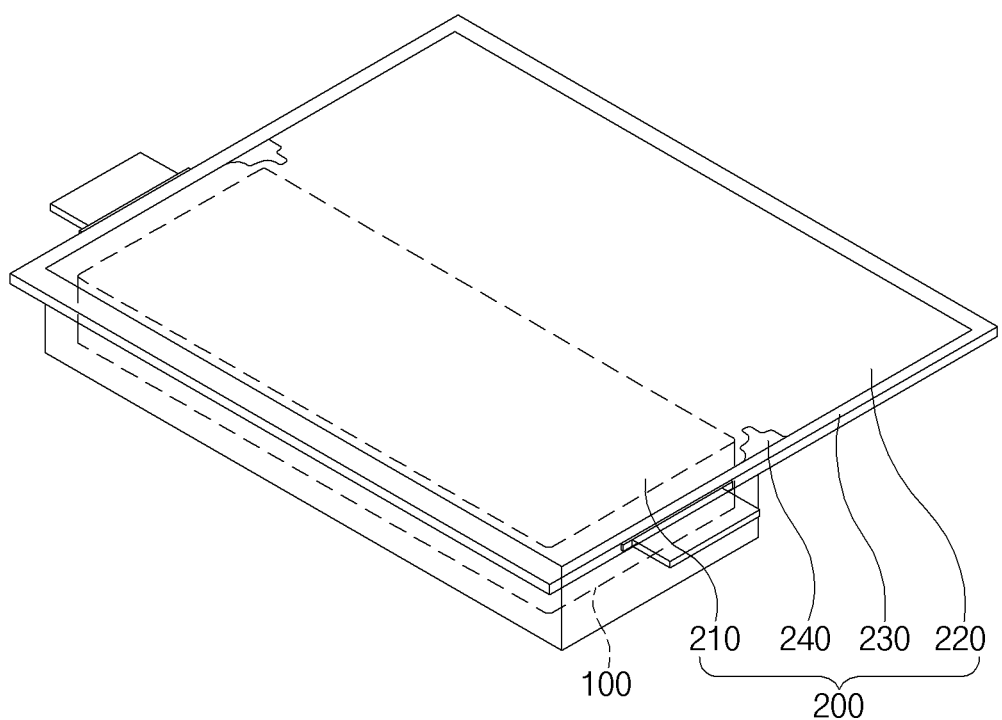
FIG. 1 is a perspective view of a secondary battery according to a first embodiment of the present invention.

Hereinafter, embodiments of the present invention will be described in detail with reference to the accompanying drawings in such a manner that the technical idea of the present invention may easily be carried out by a person with ordinary skill in the art to which the invention pertains. The present invention may, however, be embodied in different forms and should not be construed as limited to the embodiments set forth herein. In the drawings, anything unnecessary for describing the present invention will be omitted for clarity, and also like reference numerals in the drawings denote like elements.

Secondary Battery According to First Embodiment of the Present Invention

Figure 2:
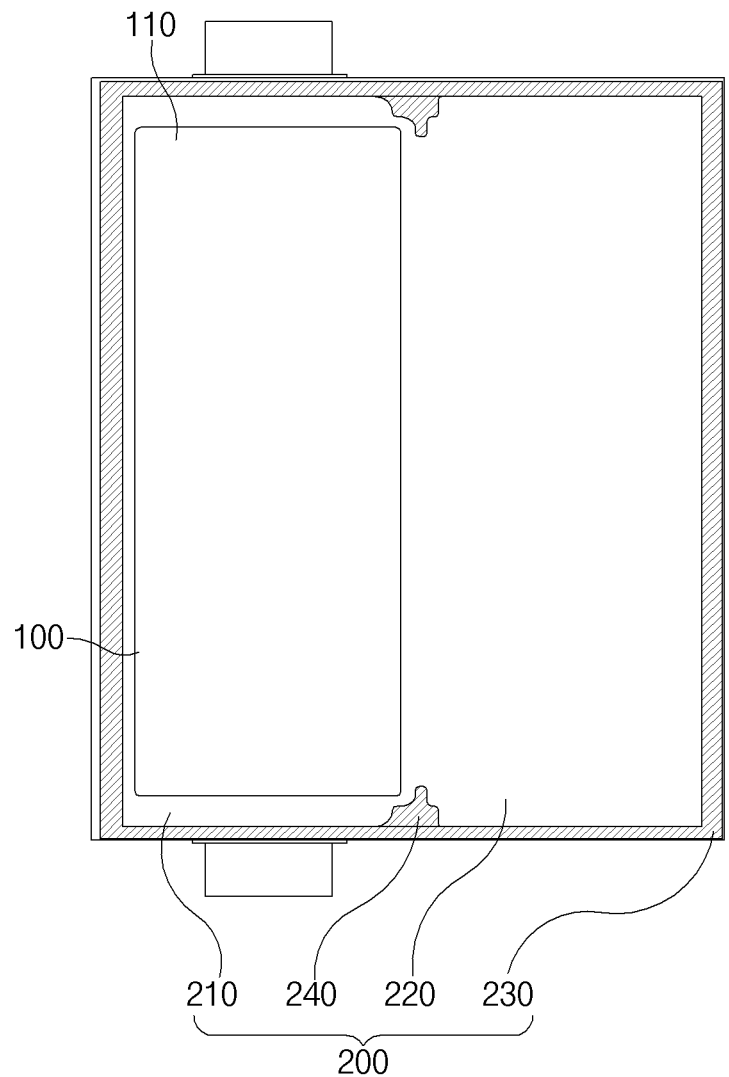
FIG. 2 is a top cross-sectional view of FIG. 1.
Figure 3:
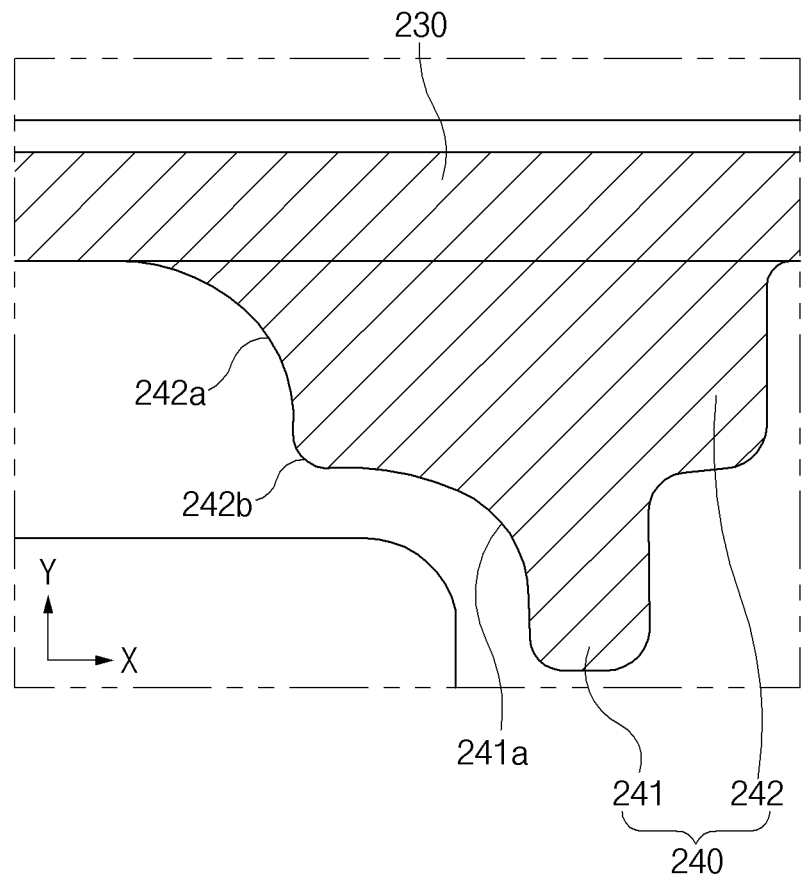
FIG. 3 is a partial enlarged view of FIG. 2.

As illustrated in FIGS. 1 to 3, a secondary battery 1 according to a first embodiment of the present invention comprises an electrode assembly 100 and a pouch 200 accommodating the electrode assembly 100.

Electrode Assembly

The electrode assembly 100 has a structure in which a plurality of electrodes and a plurality of separators are alternately stacked, and the plurality of electrodes are provided as a positive electrode and a negative electrode. Also, a positive electrode tab and a negative electrode tab are provided on the positive electrode and the negative electrode, respectively.

Pouch

The pouch 200 comprises an accommodation part 210 provided at one side thereof to accommodate the electrode assembly, a gas pocket part 220 provided at the other side thereof to collect a gas generated in the accommodation part 210, an edge sealing part 230 provided along each of edge surfaces of the accommodation part 210 and the gas pocket part 220, and a corner sealing part 240 provided on each of both ends of a boundary between the accommodation part 210 and the gas pocket part 220 to support the electrode assembly 100 accommodated in the accommodation part 210.

The corner sealing part 240 may be damaged, i.e., finely cracked by uneven abrasion or stabbing due to collision caused by movement of the electrode assembly 100.

In order to solve the above problems, in the secondary battery according to the first embodiment of the present invention, the corner sealing part 240 may be improved in structure to reinforce the strength of the corner sealing part 240, thereby preventing the corner sealing part 240 from being damaged.

For example, the corner sealing part 240 comprises a full-width support surface 241 or lateral support surface supporting one end in the full-width direction (in a left direction (X) or lateral direction when viewed in FIG. 3) of the electrode assembly, which faces the gas pocket part 220, and a full-length support surface 242 or longitudinal support surface provided between the full-width support surface 241 and the edge sealing part 230, having a width greater than that of the full-width support surface 241, and supporting one end in the full-length direction (a vertical direction (Y) or longitudinal direction when viewed in FIG. 3) of the electrode assembly 100, which faces the edge sealing part 230.

That is, the corner sealing part 240 may be provided to be connected to the edge sealing part 230, thereby significantly increasing in strength. Particularly, the end protruding in the direction of the electrode assembly 100 may be minimized to minimize impact force against the electrode assembly 100, thereby preventing the corner sealing part from being unevenly worn, stabbed, or cracked.

In particular, the full-length support surface 242, the full-width support surface 241, and the edge sealing part 230 are integrally connected to each other. That is, when the edge sealing part 230 is sealed, the corner sealing part 240 comprising the full-length support surface 242 and the full-width support surface 241 may be sealed to be connected together, thereby significantly improving ease of manufacturing and the strength of the corner sealing part 240.

In the secondary battery having the above-described structure according to the first embodiment of the present invention, the corner sealing part 240 may be provided to be integrally connected to the edge sealing part 230 to significantly improve the strength of the corner sealing part 240, and thus, the corner sealing part may be prevented from being unevenly worn, stabbed, or cracked to improve safety thereof.

In the corner sealing part 240, the full-length support surface 242 and the full-width support surface 241 may have the same length in the full-length direction of the electrode assembly 100. Thus, each of the full-length support surface 242 and the full-width support surface 241 may be improved in strength to stably support the surfaces in the full-width or full-length direction of the electrode assembly.

In the corner sealing part 240, one surface of the full-width support surface 241, which faces the electrode assembly 100 and is connected to the full-width support surface 241, is formed as a curved groove 241a. Thus, a rounded corner 110 of the electrode assembly 100 may be in close contact with the curved groove 241a to stably support the electrode assembly 100. Also, the rounded corner 110 of the electrode assembly 100 may be guided along the curved surface of the curved groove 241a to reduce the impact, thereby preventing the corner sealing part 240 from being unevenly worn, stabbed, or cracked.

In the corner sealing part 240, one surface of the full-length support surface 242, which faces the electrode assembly 100 and is connected to the edge sealing part 230, is formed as a curved groove 242a. Thus, a rounded corner 110 of the electrode assembly 100 may be in close contact with the curved groove 242a to stably support the electrode assembly 100. Particularly, the rounded corner 110 of the electrode assembly 100 may be guided along the curved surface of the curved groove 242a to reduce the impact, thereby preventing the corner sealing part 240 from being unevenly worn, stabbed, or cracked.

Here, each of the curved groove 241a of the full-width support surface 241 and the curved groove 242a of the full-length support surface 242 may have a curvature radius greater than that of the rounded corner 110 of the electrode assembly 100. Thus, even though the rounded corner of the electrode assembly 100 is supported on the ends of the curved grooves 241a and 241b, the rounded corner may be guided to be disposed at a center of the curved groove 241, and thus, the electrode assembly 100 may be stably supported.

In the corner sealing part 240, the corner of the full-length support surface 242 facing the electrode assembly 100 is formed as a curved protrusion 242b. That is, the corner of the full-length support surface 242 facing the electrode assembly 100 may be curved to prevent the curved protrusion 242b from being unevenly worn or stabbed by the electrode assembly 100.

That is, the corner 110 of the electrode assembly 100 is guided along the curved surface of the curved protrusion 242b. That is to say, the rounded corner 110 of the electrode assembly 100 may be guided to be supported on the curved groove 241a of the full-width support surface 241 and the curved groove 242a of the full-length support surface 242. Particularly, the corner of the full-length support surface 242 may be prevented from being unevenly worn, stabbed, or cracked due to collision with the electrode assembly.

In the corner sealing part 240, the curved groove 241a of the full-width support surface 241 and the curved groove 242a of the full-length support surface 242 have the same curvature radius. That is, since the curved groove 241a of the full-width support surface 241 and the curved groove 242a of the full-length support surface 242 have the same curvature radius, the curved groove 241a of the full-width support surface 241 and the curved groove 242a of the full-length support surface 242 may have the same support force.

In the corner sealing part 240, the curved protrusion 242b has a curvature radius less than that of each of the curved groove 241a of the full-width support surface 241 and the curved groove 242a of the full-length support surface 242. Thus, since the electrode assembly 100 supported by the curved groove 241a of the full-width support surface 241 is supported on the curved protrusion 242b, the electrode assembly 100 may be prevented from moving to the curved groove 242a of the full-length support surface 242.

Therefore, the secondary battery having the above-described structure according to the first embodiment of the present invention may significantly increase in strength of the corner sealing part to prevent the corner sealing part from being damaged, for example, unevenly worn, stabbed, or cracked, thereby improving the safety.

Hereinafter, a method for manufacturing the secondary battery according to the first embodiment of the present invention will be described.

Figure 4:
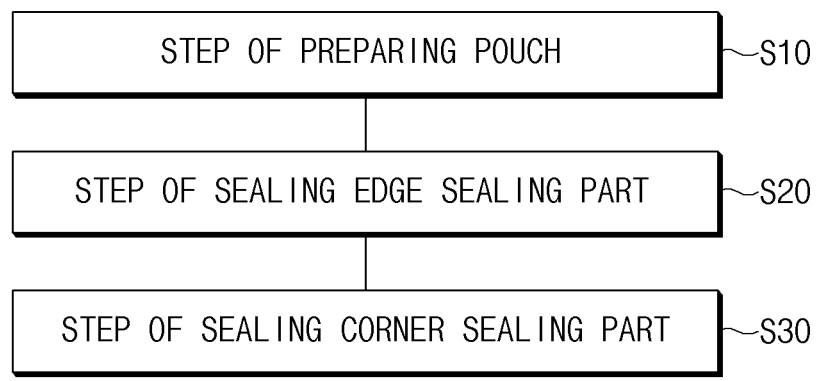
FIG. 4 is a flowchart illustrating a method for manufacturing the secondary battery according to the first embodiment of the present invention.

Method for Manufacturing Secondary Battery According to First Embodiment of the Present Invention As illustrated in FIG. 4, the method for manufacturing the secondary battery according to the first embodiment of the present invention comprises a pouch preparation step (S10), a first sealing step (S20), and a second sealing step (S30).

Pouch Preparation Step

In the pouch preparation step (S10), a pouch 200 comprising an accommodation part 210 accommodating an electrode assembly 100 and a gas pocket part 220 collecting a gas generated in the accommodation part 210.

First Sealing Step

The first sealing step (S20) is performed to seal edge surfaces of the accommodating part and the electrode assembly. After accommodating the electrode assembly 100 in the accommodation part 210 of the pouch 200, the edge surfaces of the accommodating part 210 and the gas pocket part 220 except for a portion between the accommodation part 210 and the gas pocket part 220 may be sealed to form an edge sealing part 230.

Second Sealing Step

The second sealing step (S30) is performed to form the corner sealing part supporting the electrode assembly accommodated in the accommodation part while equalizing the accommodation part and the gas pocket part. Here, both ends of a boundary between the accommodation part 210 and the gas pocket pat 220 are sealed to form a corner sealing part 240.

When the second sealing step (S30) is completed as described above, a finished secondary battery may be manufactured.

In the second sealing step (S30), the corner sealing part 240 comprises a full-width support surface 241 supporting one end in a full-width direction of the electrode assembly, which faces the gas pocket part 220, and a full-length support surface 242 provided between the full-width support surface 241 and the edge sealing part 230, having a width greater than that of the full-width support surface 241, and supporting one end in a full-length direction of the electrode assembly 100, which faces the edge sealing part 230.

That is, in the second sealing step (S30), the full-length support surface 242, the full-width support surface 241, and the edge sealing part 230 are sealed to be integrally connected to each other, and thus, the corner sealing part 240 may minimize an end protruding toward the electrode assembly 100 to prevent the corner sealing part from being damaged, for example, unevenly worn, stabbed, or cracked by the electrode assembly.

In the second sealing step (S30), when the full-width support surface 241 is sealed, one surface of the full-width support surface 241, which faces the electrode assembly 100 and is connected to the full-width support surface 242, may be sealed as a curved groove 241a to increase in a close contact area between the rounded corner of the electrode assembly and the curved groove 241a, thereby preventing the corner sealing part from being damaged by the electrode assembly.

In the second sealing step (S30), when the full-length support surface 242 is sealed, one surface of the full-length support surface 242, which faces the electrode assembly 100 and is connected to the edge sealing part 230, may be sealed as a curved groove 242a to increase in a close contact area between the rounded corner and the curved groove 242a, thereby preventing the corner sealing part from being damaged by the electrode assembly.

In the second sealing step (S30), when the full-length support surface 242 is sealed, a corner of the full-length support surface 242, which faces the electrode assembly 100, is sealed as a curved protrusion 242b, and thus, the electrode assembly may be guided to be inserted into the curved groove 241a of the full-width support surface 241 or the curved groove 242a of the full-length support surface 242 along a curved surface of the curved protrusion 242b to prevent the corner of the full-length support surface 242 from being damaged, for example, unevenly worn, stabbed, and the cracked.

Hereinafter, in describing another embodiment of the present invention, the same reference numerals are used for the same components as those of the above-described embodiment, and duplicated descriptions will be omitted.

Secondary Battery According to Second Embodiment of the Present Invention

Figure 5:
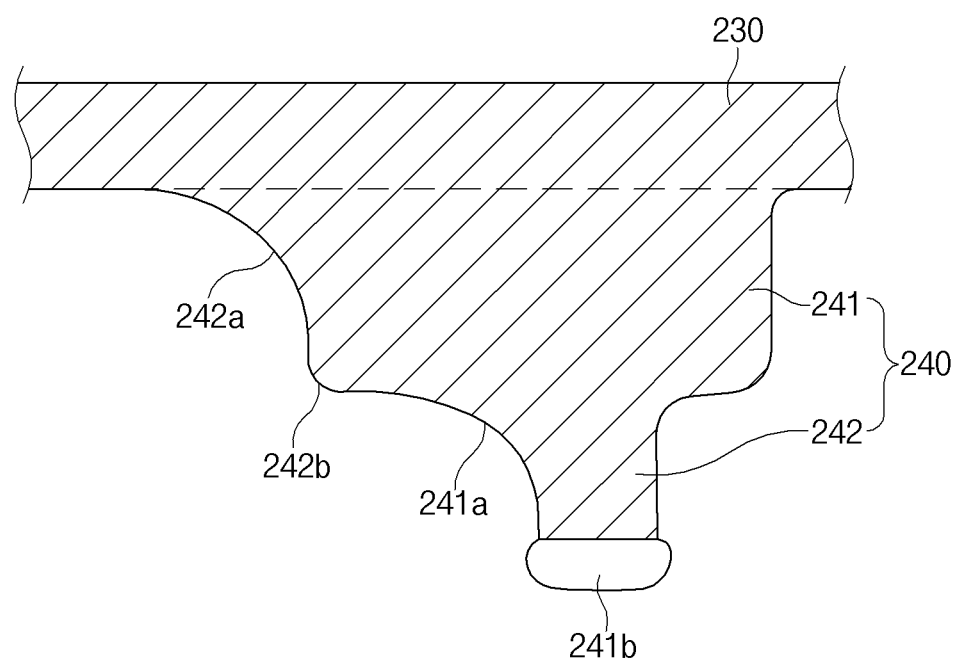
FIG. 5 is a cross-sectional view of a secondary battery according to a second embodiment of the present invention.

As illustrated in FIG. 5, in a secondary battery according to a second embodiment of the present invention, a support protrusion 241b is formed on an end of a full-width support surface 241 provided on a corner sealing part 240, and the support protrusion 241b has a width greater than that of the full-width support surface 241 when viewed in a full-width direction of the electrode assembly 100. As a result, strength of the end of the full-width support surface 241 may significantly increase, and thus, the secondary battery according to the second embodiment of the present invention may comprise the support protrusion 241b to prevent the end of the full-width support surface 241 from being damaged, for example, unevenly worn, stabbed, or cracked due to collision with the electrode assembly 100.

The support protrusion 241b may have an elliptical shape. Thus, the electrode assembly 100 and the support protrusion 241b may not collide frontally with each other and, but be guided along a curved surface of the support protrusion 241b to reduce impact force, thereby preventing the support protrusion 241b from being damaged.

Secondary Battery According to Third Embodiment of the Present Invention

Figure 6:
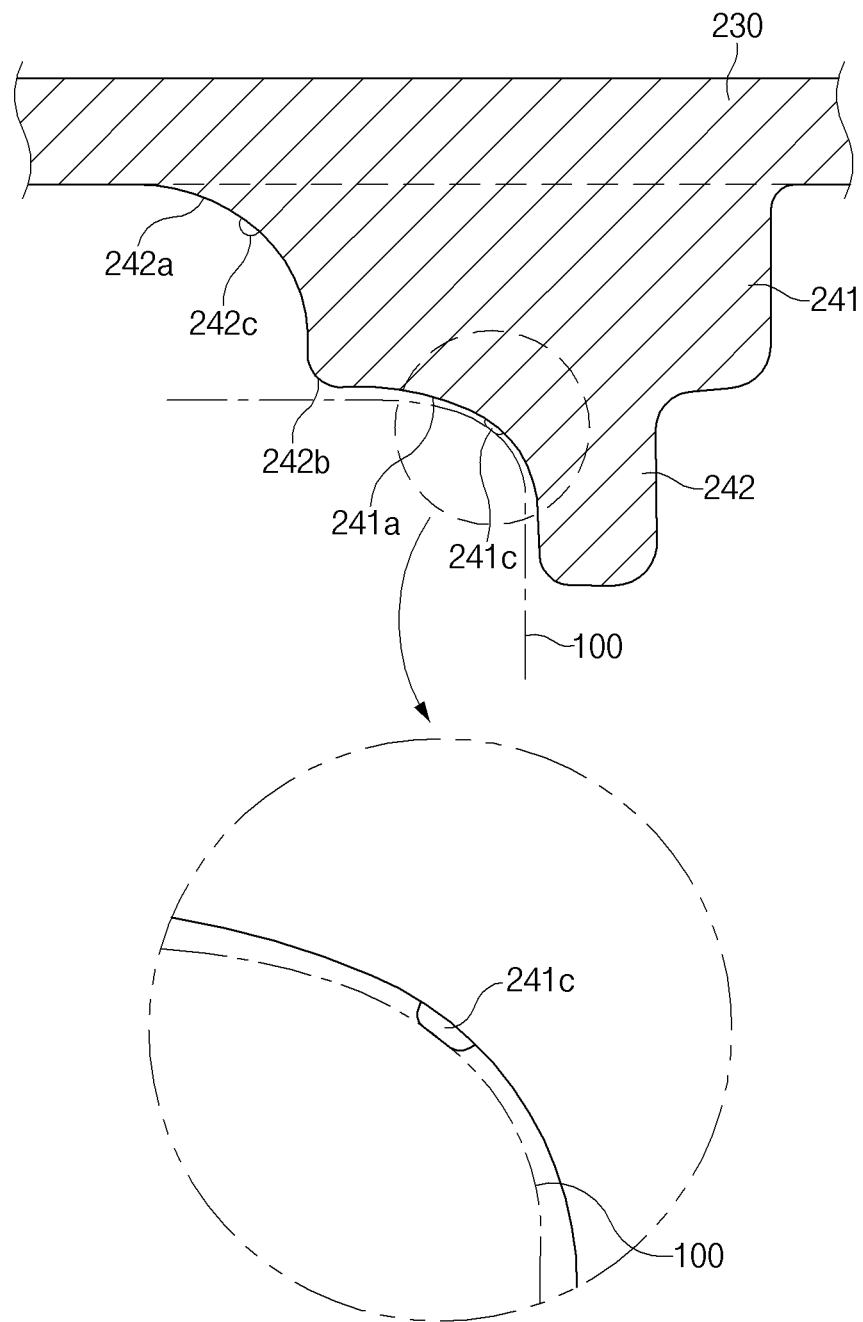
FIG. 6 is a cross-sectional view of a secondary battery according to a third embodiment of the present invention.

As illustrated in FIG. 6, in a secondary battery according to a third embodiment of the present invention, one or more buffer protrusions 241c are formed on a curved groove 241c of a full-width support surface 241 formed on a corner sealing part 240. Here, each of the buffer protrusions 241c protrudes toward the electrode assembly 100. Thus, the electrode assembly 100 may be supported on the buffer protrusion 241c and then supported on a curved groove 241a of the full-width support surface 241 to significantly reduce impact force applied to the curved groove 241a of the full-width support surface 241.

In addition, one or more buffer protrusions 242c protruding in a direction facing the electrode assembly 100 may be provided on a curved groove 242a of a full-length support surface 242 formed on a corner sealing part 240. Thus, the electrode assembly 100 may be supported first on the buffer protrusion 242c and then supported on the curved groove 242a of the full-length support surface 242 to reduce impact force applied to the curved groove 242a of the full-length support surface 242 through the electrode assembly.

Therefore, the secondary battery according to the third embodiment of the present invention may comprise the buffer protrusions 241c and 242c to partially reduce the impact force of the electrode assembly 100, and thus, the curved grooves 241a and 242a may be prevented from being damaged, for example, unevenly worn, stabbed, or cracked.

The buffer protrusions 241c and 242c have arc shapes protruding by 1 mm to 3 mm from the curved grooves 241a and 242a, respectively. That is, referring to the enlarged view of FIG. 6, the buffer protrusions 241c and 242c are pressed to be flattened when in contact with the electrode assembly to reduce the impact of the electrode assembly, thereby significantly preventing the corner sealing part 240 from being unevenly worn or stabbed.

The buffer protrusions 241*c* and 242*c* may be attached to the position at which the curved grooves of the corner sealing part 240 are to be formed, to prevent the corner sealing part from being damaged by the buffer protrusions.

Accordingly, the scope of the present invention is defined by the appended claims more than the foregoing description and the exemplary embodiments described therein. Various modifications made within the meaning of an equivalent of the claims of the invention and within the claims are to be regarded to be in the scope of the present invention.

DESCRIPTION OF THE SYMBOLS

100: Electrode assembly
200: Pouch
210: Accommodation part
220: Gas pocket part
230: Edge sealing part
240: Corner sealing part
241: Full-width support surface
241*a*: Curved groove
241*b*: Support protrusion
241*c*: Buffer protrusion
242: Full-length support surface

The invention claimed is:

1. A secondary battery comprising:
a pouch comprising an accommodation part accommodating an electrode assembly therein, a gas pocket part configured to collect a gas generated in the accommodation part, an edge sealing part provided along each of edge surfaces of the accommodation part and the gas pocket part, and a corner sealing part provided on each of two opposite ends of a boundary between the accommodation part and the gas pocket part, the corner sealing part being configured to support the electrode assembly accommodated in the accommodation part,
wherein the corner sealing part comprises a lateral support surface having one end thereof supported in a lateral direction of the electrode assembly, which faces the gas pocket part, and a longitudinal support surface provided between the lateral support surface and the edge sealing part, having a width in a longitudinal direction of the electrode assembly greater than a width of the lateral support surface in the longitudinal direction, the longitudinal direction being perpendicular to the lateral direction, and having one end thereof supported in the lateral direction of the electrode assembly, which faces the edge sealing part, and
the longitudinal support surface, the lateral support surface, and the edge sealing part are integrally connected to each other,
wherein the longitudinal support surface and the lateral support surface have a same length in the lateral direction of the electrode assembly,
wherein one surface of the lateral support surface, which faces the electrode assembly and is connected to the longitudinal support surface, has a curved groove shape, and
wherein one surface of the longitudinal support surface, which faces the electrode assembly and is connected to the edge sealing part, has a curved groove shape.

2. The secondary battery of claim 1, wherein a corner of the longitudinal support surface, which faces the electrode assembly, has a curved protrusion shape.

3. The secondary battery of claim 2, wherein the one surface of the lateral support surface and the one surface of the longitudinal support surface have a same curvature radius.

4. The secondary battery of claim 3, wherein the corner of the longitudinal support surface has a curvature radius less than that of the one surface of the lateral support surface and the one surface of the longitudinal support surface.

5. The secondary battery of claim 1, wherein the corner sealing part has a support protrusion having a width greater than a width of the lateral support surface when viewed in the lateral direction of the electrode assembly, the support protrusion being disposed on an end of the lateral support surface.

6. The secondary battery of claim 1, wherein the corner sealing part has one or more buffer protrusions, each of which has an arc shape and which protrudes from the one surface of the lateral support surface in a direction facing the electrode assembly.

7. The secondary battery of claim 1, wherein the corner sealing part has one or more buffer protrusions, each of which has an arc shape and which protrudes from the one surface of the longitudinal support surface in a direction facing the electrode assembly.

8. A method for manufacturing a secondary battery, the method comprising:
a pouch preparation step of preparing a pouch comprising an accommodation part accommodating an electrode assembly therein and a gas pocket part configured to collect a gas generated in the accommodation part;
a first sealing step of sealing edge surfaces of the accommodating part and the gas pocket part such that the electrode assembly is accommodated in the accommodation part of the pouch, the first sealing step forming an edge sealing part; and
a second sealing step of sealing each of two opposite ends of a boundary between the accommodation part and the gas pocket part to form a corner sealing part,
wherein, during the second sealing step, the corner sealing part is formed having a lateral support surface having one end thereof supported in a lateral direction of the electrode assembly, which faces the gas pocket part, and having a longitudinal support surface provided between the lateral support surface and the edge sealing part, having a width in a longitudinal direction of the electrode assembly greater than a width of the lateral support surface in the longitudinal direction, the longitudinal direction being perpendicular to the lateral direction, and having one end thereof supported in the lateral direction of the electrode assembly, which faces the edge sealing part, and
the longitudinal support surface, the lateral support surface, and the edge sealing part are integrally connected to each other,
wherein the longitudinal support surface and the lateral support surface have a same length in the lateral direction of the electrode assembly,
wherein one surface of the lateral support surface, which faces the electrode assembly and is connected to the longitudinal support surface, has a curved groove shape, and
wherein one surface of the longitudinal support surface, which faces the electrode assembly and is connected to the edge sealing part, has a curved groove shape.

9. The method of claim 8, wherein a corner of the longitudinal support surface, which faces the electrode assembly, has a curved protrusion shape.

* * * * *